US008694552B2

(12) United States Patent
Koike et al.

(10) Patent No.: US 8,694,552 B2
(45) Date of Patent: Apr. 8, 2014

(54) MANAGEMENT SYSTEM, ELECTRONIC INSTRUMENT, AND MANAGEMENT METHOD

(75) Inventors: Hisashi Koike, Nagano (JP); Minoru Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 13/049,246

(22) Filed: Mar. 16, 2011

(65) Prior Publication Data

US 2011/0238704 A1    Sep. 29, 2011

(30) Foreign Application Priority Data

Mar. 24, 2010 (JP) .................................. 2010-067459
Mar. 24, 2010 (JP) .................................. 2010-067461

(51) Int. Cl.
*G06F 7/00* (2006.01)
*G06F 17/30* (2006.01)

(52) U.S. Cl.
USPC ............................................ 707/802; 705/22

(58) Field of Classification Search
CPC ..... G06Q 20/203; G06Q 10/08; G06Q 30/00; G06Q 30/06
USPC ........................................................ 707/802
See application file for complete search history.

(56) References Cited

U.S. PATENT DOCUMENTS

| 6,233,409 B1 * | 5/2001 | Haines et al. .................... 399/10 |
| 6,363,226 B1 | 3/2002 | Batori |
| 6,798,997 B1 * | 9/2004 | Hayward et al. ................. 399/12 |
| 7,062,451 B1 * | 6/2006 | Dentel et al. .................. 705/26.7 |
| 7,230,730 B2 * | 6/2007 | Owen et al. ................... 358/1.14 |
| 7,279,628 B2 * | 10/2007 | Miyamoto et al. ............... 84/615 |
| 7,660,539 B2 * | 2/2010 | Tye et al. ........................ 399/24 |
| 2002/0059106 A1 | 5/2002 | Tani |
| 2002/0113991 A1 * | 8/2002 | Borg et al. .................... 358/1.15 |
| 2002/0186406 A1 * | 12/2002 | Phillips et al. ................ 358/1.15 |

(Continued)

FOREIGN PATENT DOCUMENTS

| JP | 11-243465 A | 9/1999 |
| JP | 2001-075435 A | 3/2001 |
| JP | 2003-216710 A | 7/2003 |
| JP | 2004-272540 A | 9/2004 |

(Continued)

OTHER PUBLICATIONS

HP, "HP Introduce System to Automatically Re-Order Toner Vartridges Online", Oct. 2001.*

(Continued)

*Primary Examiner* — Binh V Ho
(74) *Attorney, Agent, or Firm* — Global IP Counselors, LLP

(57) ABSTRACT

A management system includes an electronic instrument that uses a managed article, and a management server. The electronic instrument is configured to acquire identification information from the managed article used by the electronic instrument with the identification information being read-only information, and to transmit information including the identification information to the management server. The management server is configured to reference registered database, in which information corresponding to the identification information of a plurality of managed articles is registered in advance, using the identification information transmitted from the electronic instrument to determine whether identification information database is required to be updated by the information transmitted from the electronic instrument, and to record at least a portion of the information transmitted from the electronic instrument in the identification information database as being associated with the identification information when it is determined that the identification information database is required to be updated.

14 Claims, 9 Drawing Sheets

(56) References Cited

U.S. PATENT DOCUMENTS

| | | | |
|---|---|---|---|
| 2004/0183748 A1* | 9/2004 | Silverbrook et al. | 345/1.1 |
| 2005/0152544 A1 | 7/2005 | Kizawa | |
| 2005/0283666 A1 | 12/2005 | Marshall et al. | |
| 2007/0188530 A1* | 8/2007 | Garrana et al. | 347/7 |
| 2008/0071626 A1* | 3/2008 | Hill | 705/22 |
| 2008/0079585 A1* | 4/2008 | Hirota et al. | 340/572.1 |
| 2008/0088685 A1 | 4/2008 | Lucas et al. | |
| 2009/0016743 A1* | 1/2009 | Tye et al. | 399/8 |
| 2009/0192910 A9* | 7/2009 | Rankin et al. | 705/26 |

FOREIGN PATENT DOCUMENTS

| | | |
|---|---|---|
| JP | 2005-115640 A | 4/2005 |
| JP | 2005-210310 A | 8/2005 |
| JP | 2007-323002 A | 12/2007 |
| JP | 2008-094095 A | 4/2008 |
| WO | WO-01/63489 A1 | 8/2001 |

OTHER PUBLICATIONS

Extended European Search Report dated Jun. 5, 2012 for the corresponding European Patent Application No. 11159481.8.

* cited by examiner

USER DATABASE

244

| USER ID | POINT | PRINTER ID | CARTRIDGE ID |
|---|---|---|---|
| User A (aaaaaaaa) | 500 Pt | Pxxxxxx1 | Cxxxxxx1 |
| | | | Cxxxxxx2 |
| | | | Cxxxxxx3 |
| ⋮ | ⋮ | ⋮ | ⋮ |

Fig. 7

USER DATABASE

244b

| USER ID | POINT | PRINTER ID | CARTRIDGE ID | INK LEVEL |
|---|---|---|---|---|
| User A (aaaaaaaa) | 500 Pt | Pxxxxxx1 | Cxxxxxx1 | 50% |
| | | | Cxxxxxx2 | 90% |
| | | | Cxxxxxx3 | 10% |
| ⋮ | ⋮ | ⋮ | ⋮ | ⋮ |

MANAGEMENT SYSTEM, ELECTRONIC INSTRUMENT, AND MANAGEMENT METHOD

CROSS-REFERENCE TO RELATED APPLICATIONS

This application claims priority to Japanese Patent Application No. 2010-067459 filed on Mar. 24, 2010 and Japanese Patent Application No. 2010-067461 filed on Mar. 24, 2010. The entire disclosures of Japanese Patent Application Nos. 2010-067459 and 2010-067461 are hereby incorporated herein by reference.

BACKGROUND

1. Technical Field

The present invention relates to a technique for managing an ink cartridge installed in a printer, or for managing another object used in an electronic instrument.

2. Related Art

In a conventional ink cartridges (including toner cartridges; the same hereinafter) for installation in a printer, a memory IC or other writable storage device is sometimes provided (see Japanese Laid-Open Patent Application Publication No. 2003-216710 and Japanese Laid-Open Patent Application Publication No. 2005-115640, for example). A serial number, manufacturer ID, and other information of the ink cartridge, for example, are recorded in the storage device. Information indicating the ink level is also sometimes written in the storage device by the printer in which the ink cartridge is installed. By using these items of information, the printer can manage the ink level or the identification of each ink cartridge.

However, the writable storage device is an electronic component, and is therefore generally expensive, and this high cost hinders efforts to lower the cost of the ink cartridge. There is therefore a need for a technique of managing individual ink cartridges without mounting a writable storage device. The need for such a technique is not limited to use in ink cartridges, and the same need exists for a technique of managing printing paper and other media, storage media such as DVDs, CDs, and memory cards, and other objects that are used in electronic instruments.

SUMMARY

In view of the foregoing, an object of the present invention is to provide a technique whereby objects used in an electronic instrument can be individually managed without providing a writable storage device to the objects.

The present invention for overcoming at least some of the problems described above can be realized by the embodiments or application examples described below.

A management system according to a first aspect of the present invention includes an electronic instrument that uses a managed article, and a management server configured to communicate with the electronic instrument. The electronic instrument includes an acquisition section and an electronic instrument-side communication section. The acquisition section is configured to acquire identification information from the managed article used by the electronic instrument, the identification information being read-only information. The electronic instrument-side communication section is configured to transmit information including the identification information acquired by the acquisition section to the management server. The management server includes a management server-side communication section, a storage section and a management section. The management server-side communication section is configured to receive the information transmitted from the electronic instrument. The storage section is configured to store registered database in which information corresponding to the identification information of a plurality of managed articles is registered in advance, and to store identification information database. The management section is configured to reference the registered database using the identification information included in the information transmitted from the electronic instrument to determine whether the identification information database is required to be updated by the information transmitted from the electronic instrument, and to record at least a portion of the information transmitted from the electronic instrument in the identification information database as being associated with the identification information when it is determined that the identification information database is required to be updated by the information transmitted from the electronic instrument.

The term "read-only information" used above refers to information which cannot be written by the electronic instrument, and includes information which can be written by using a separate device, or information to which a clear-all function can be applied. In the managed article managed in the management system, identification information specific to the managed article is recorded in non-writable or non-rewritable fashion as information which can be read optically or non-optically, and the electronic instrument optically or non-optically reads the identification information from the managed article and transmits the information to the management server. Therefore, through the management system configured as described above, the managed article can be managed by the management server without providing a writable storage device to the managed article. Furthermore, in the configuration described above, the management server records the received identification information in the identification information database in a case in which the information corresponding to the received identification information is already registered in the registered database in which information corresponding to a plurality of identification information is registered in advance. A managed article which is tracked in advance by the management server and is actually used by the electronic instrument can be designated as the object to be managed. As a result, it is possible to manage the managed articles sold for each predetermined sales outlet, for example. Registration in the registered database is not limited to identification information being registered without modification thereto, and by not including identification information in the registered database, indirect registration is possible, or an identification information rule may be registered in the registered database. A printer, for example, may be applied as the electronic instrument, and an ink cartridge (including a cartridge for toner ink) or printing medium, for example, may be applied as the managed article.

A management system according to a second aspect of the present invention includes an electronic instrument that uses a managed article, and a management server configured to communicate with the electronic instrument. The electronic instrument includes an acquisition section and an electronic instrument-side communication section. The acquisition section is configured to acquire identification information from an item accompanying the managed article used by the electronic instrument, the identification information being read-only information. The electronic instrument-side communication section is configured to transmit information including the identification information acquired by the acquisition section to the management server. The management server includes a management server-side communication section, a storage section and a management section. The management server-side communication section is configured to receive the information transmitted from the electronic instrument. The storage section is configured to store registered database in which information corresponding to the identification information of a plurality of managed articles is registered in advance, and to store identification information database. The management section is configured to reference the registered database using the identification information included in the information transmitted from the electronic instrument to determine whether the identification information database is required to be updated by the information transmitted from the electronic instrument, and to record at least a portion of the information transmitted from the electronic instrument in the identification information database as being associated with the identification information when it is determined that the identification information database is required to be updated by the information transmitted from the electronic instrument.

As in this configuration, a configuration may be adopted in which the identification information is recorded in an accompanying item to the managed article. In this case, a printer, for example, may be applied as the electronic instrument; ink (including toner) or a printing medium, for example, may be applied as the managed article; and an ink cartridge (including a cartridge for toner ink), a spool for winding a printing medium, or a package or included item for the ink or printing medium, for example, may be applied as the accompanying item. A printer, for example, may be applied as the electronic device; an ink cartridge (including a cartridge for toner ink), for example, may be applied as the managed article; and a package or included item for the ink cartridge, for example, may be applied as the accompanying item.

A management system according to a third aspect is the management system according to the first or second aspect, wherein the electronic instrument preferably further includes a state detection section configured to detect a state of the managed article used by the electronic instrument, the electronic instrument-side communication section is preferably configured to transmit the information including the identification information and state information which indicates the state of the managed article to the management server, the management server-side communication section is preferably configured to receive the information including the identification information and the state information from the electronic instrument, and the management section of the management server is preferably configured to associate the state information with the identification information included in the information transmitted from the electronic instrument and to record the state information in the identification information database.

Through such a configuration, the management server can manage not only the identification information of the managed article, but the state thereof as well. The "state" of the managed article refers to the ink level, or error information or the like conveyed with respect to the ink cartridge, for example, when the managed article is an ink cartridge. In the present application, the "ink level" is assumed to include the "amount of ink used," which indirectly indicates the ink level.

A management system according to a fourth aspect is the management system according to the third aspect, wherein the management section of the management server is preferably configured to reference the identification information database to determine whether the identification information included in the information transmitted from the electronic instrument matches the identification information that is already recorded in the identification information database, and to transmit the state information associated with the identification information in the identification information database to the electronic instrument when it is determined that the identification information included in the information transmitted from the electronic instrument matches the identification information that is already recorded in the identification information database.

Through such a configuration, even when the same managed article is used in different electronic instruments, the state information that indicates the state detected by the previous electronic instrument can be conveyed as a notification to the next electronic instrument in which the managed article is used.

A management system according to a fifth aspect is the management system according to any of the first to fourth aspects, wherein the identification information database stored in the storage section of the management server preferably includes user identification information for identifying a user of the electronic instrument, the electronic instrument-side communication section of the electronic instrument is preferably configured to transmit the information including the identification information and the user identification information to the management server, and the management section of the management server is preferably configured to reference the registered database and the identification information database to determine whether the information corresponding to the identification information included in the information transmitted from the electronic instrument is registered in the registered database but the identification information is not yet recorded in the identification information database, and to record earned points in the identification information database for the user indicated by the user identification information included in the information transmitted from the electronic instrument when it is determined that the information corresponding to the identification information included in the information transmitted from the electronic instrument is registered in the registered database but the identification information is not yet recorded in the identification information database.

Through such a configuration, when a managed article registered in the registered database is used in an electronic instrument for the first time, points can be imparted to the user of the managed article.

A managements system according to a sixth aspect is the management system according to any of the first to fifth aspects, wherein the electronic instrument preferably includes an electronic instrument-side storage section configured to accumulate and store the identification information acquired by the acquisition section, and the electronic instrument-side communication section is preferably configured to transmit the information including the identification information to the management server when it is determined that the identification information acquired by the acquisition section has not been stored in the electronic instrument-side storage section.

Through such a configuration, a determination can be made on the electronic instrument side as to whether the managed article is being used by the electronic instrument for the first time.

A management system according to a seventh aspect is the management system according to any of the first to sixth aspects, wherein the electronic instrument preferably further includes a setting receiving section configured to receive a setting for a timing at which the electronic instrument-side communication section transmits the identification information acquired by the acquisition section to the management server.

Through such a configuration, the identification information can be transmitted to the management server at various times, such as the timing at which the managed article is used by the electronic instrument for the first time, or the timing at which use by the electronic instrument ends, for example.

A management server according to an eighth aspect is a management server for managing a managed article used by an electronic instrument with identification information for the managed article being recorded as read-only information on the managed article or an item accompanying the managed article. The management server includes a management server-side communication section, a storage section and a management section. The management server-side communication section is configured to receive the identification information from the electronic instrument. The storage section is configured to store registered database in which information corresponding to the identification information of a plurality of managed articles is registered in advance, and to store identification information database. The management section is configured to reference the registered database using the identification information included in the information transmitted from the electronic instrument to determine whether the identification information database is required to be updated by the information transmitted from the electronic instrument, and to record at least a portion of the information transmitted from the electronic instrument in the identification information database as being associated with the identification information when it is determined that the identification information database is required to be updated by the information transmitted from the electronic instrument An electronic instrument according to a ninth aspect is an electronic instrument adapted to use a managed article managed by a management system including a management server. The electronic instrument includes an acquisition section, a state detection section, and an electronic instrument-side communication section. The acquisition section is configured to acquire identification information from the managed article or from an item accompanying the managed article, the identification information being read-only information. The state detection section is configured to detect a state of the managed article used by the electronic instrument. The electronic instrument-side communication section is configured to transmit information including the identification information acquired by the acquisition section to the management server, and to receive information corresponding to the state of the managed article that is recorded in the management server as being associated with the identification information acquired by the acquisition section.

Through the management server or the electronic instrument configured such as described above, objects can be individually managed by the management server without providing storage devices to the objects used by the electronic instrument.

Besides the configuration as a management system or electronic instrument described above, the present invention can be configured as a method whereby the electronic instrument and the management server communicate with each other, a method for managing a managed article in the management system, and a computer program whereby the management system manages a managed article. The computer program may be recorded on a recording medium which is readable by computer. Examples of recording media that can be used include flexible disks, CD-ROM, DVD-ROM, magneto-optical disks, memory cards, hard disks, and various other media. The management server may be configured so that a plurality of server devices share functions, and the plurality of server devices functions in cooperation with each other. In the same manner, the electronic instrument may be configured so that a plurality of devices such as printers and computers which perform a printer driver operation share functions, and the plurality of devices functions in cooperation with each other.

BRIEF DESCRIPTION OF THE DRAWINGS

Referring now to the attached drawings which form a part of this original disclosure:

FIG. 7 is a view showing an example of the user database;

DETAILED DESCRIPTION OF EXEMPLARY EMBODIMENTS

Embodiments of the present invention will be described hereinafter in the following order based on embodiments: A. First Embodiment ((A1) System Configuration, (A2) Configuration of the Printer, (A3) Configuration of the Management Server, and (A4) Point Issuance Processing); B. Second Embodiment ((B1) System Configuration, and (B2) Point Issuance Processing); and C. Modification.

A. First Embodiment (A1) System Configuration

Figure 1:
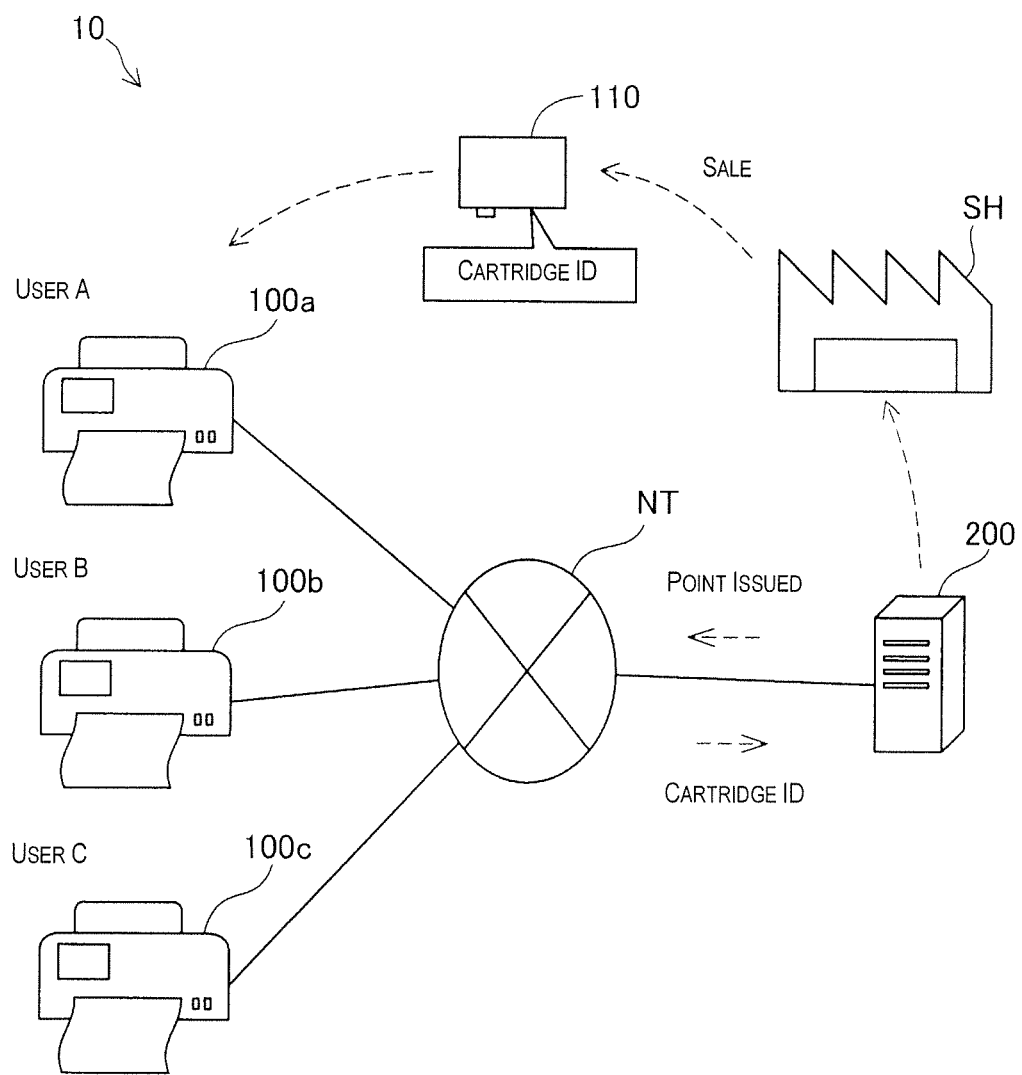
FIG. 1 is a view showing the overall configuration of the management system as a first embodiment of the present invention.

FIG. 1 is a view showing the overall configuration of the management system 10 as a first embodiment of the present invention. The management system 10 is a system for managing an ink cartridge 110 which is used by printers 100a, 100b, 100c. The printers 100a, 100b, 100c are connected to a management server 200 via the Internet NT, and the management system 10 is thereby formed. The printer 100a, printer 100b, and printer 100c each have the same configuration, and will therefore be generically described as the "printer 100" hereinafter. The printer 100 corresponds to the "electronic instrument" of the present application, and the ink cartridge 110 corresponds to the "managed article" of the present application. Three printers 100 are shown in FIG. 1, but there may be any number of printers 100.

The management server 200 is provided with an electronic transaction function for selling an ink cartridge 110 as a consumable good to a user. When the management server 200 receives an order for an ink cartridge 110 from the user, the management server 200 requests delivery of the ordered ink cartridge 110 from a delivery company SH or the like, and the ink cartridge 110 is delivered to the user's residence. At this time, the management server 200 associates identification information (referred to hereinafter as a "cartridge ID") specific to the sold ink cartridge 110 with an ID (referred to hereinafter as a "user ID") uniquely assigned to the user who placed the order, and stores the identification information.

The cartridge ID is visibly recorded on a security label which is affixed to the ink cartridge 110 (this process will be described in detail hereinafter). Each printer 100 reads the cartridge ID from the ink cartridge 110 that is installed therein and transmits the cartridge ID to the management server 200. The management server 200 issues points to the user when the cartridge ID received from the printer 100 matches the cartridge ID of the ink cartridge 110 sold through the management server 200. The points can be used in return for purchase of a new ink cartridge 110 or for repair/warranty service.

Following is a detailed description of the configuration and processing specifics for realizing the functions of the management system 10 described above.

(A2) Configuration of the Printer

Figure 2:
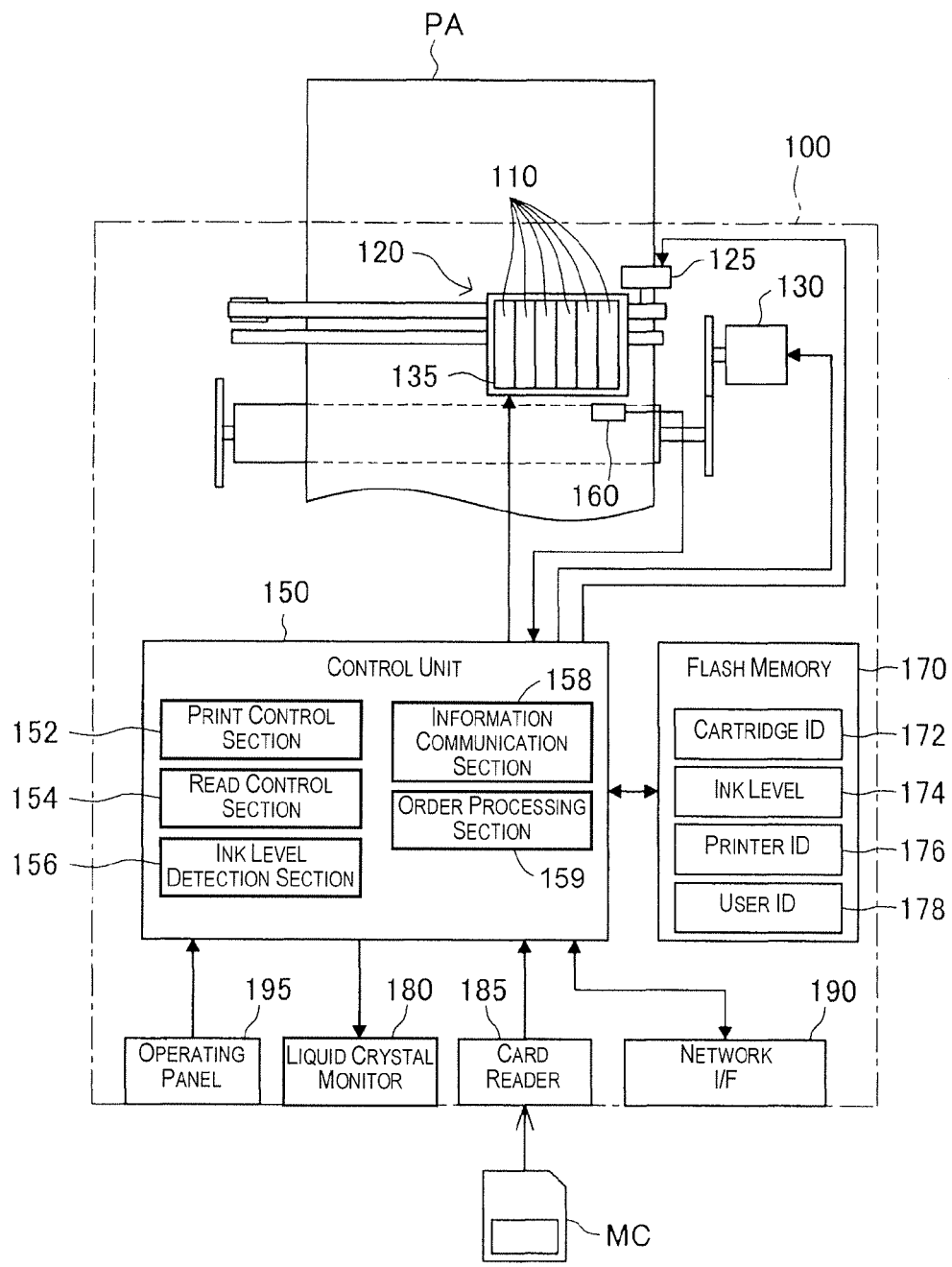
FIG. 2 is a view showing the internal configuration of the printer.

FIG. 2 is a view showing the internal configuration of the printer 100. The printer 100 is provided with a carriage 120 in which ink cartridges 110 accommodating cyan, magenta, yellow, and other ink are installed; a carriage motor 125 for driving the carriage 120 in a primary scanning direction; a paper feed motor 130 for conveying printing paper PA in a secondary scanning direction; a print head 135 for discharging ink fed from the ink cartridges 110, the print head 135 being mounted on the carriage 120; a control unit 150 for controlling the abovementioned components; and a scanner 160 for optically reading the cartridge ID from the security label which is affixed to each ink cartridge 110. The scanner 160 is composed of a light source for emitting ultraviolet rays, and a CCD image sensor.

Figures 3, 4:
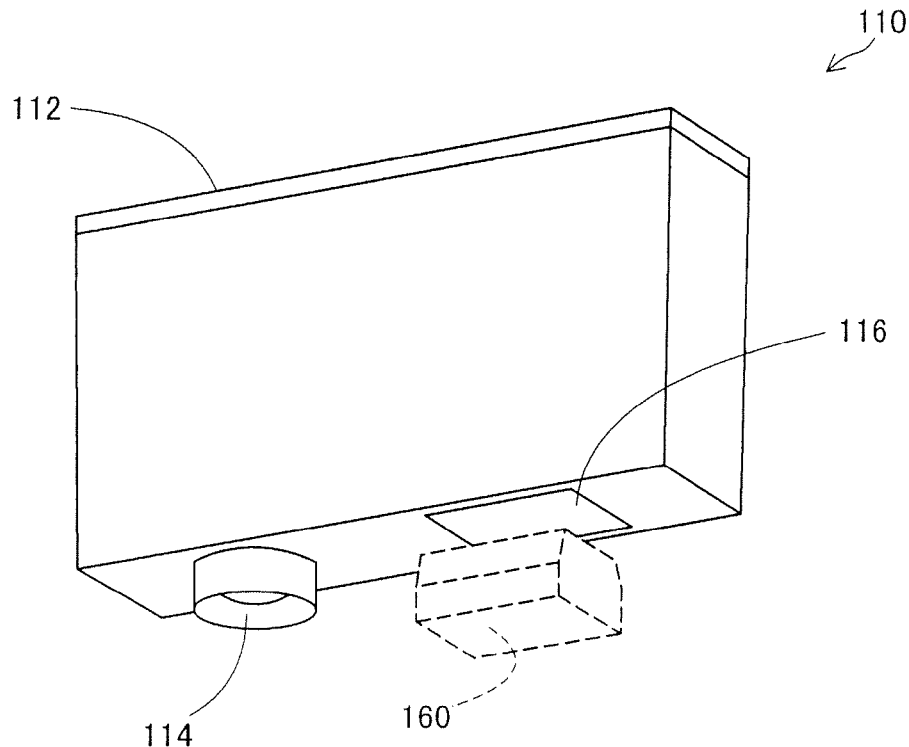
FIG. 3 is a perspective view showing the ink cartridge at an angle from the bottom side thereof.
FIG. 4 is a view showing an example of the transaction screen displayed on the liquid crystal monitor of the printer.

FIG. 3 is a perspective view showing the ink cartridge 110 at an angle from the bottom side thereof. The ink cartridge 110 is provided with a container body 112 in which ink is accommodated, and an ink feeding port 114 for feeding the ink to the print head 135. A security label 116 is affixed to the bottom surface of the container body 112, and printing formed by a combination of an overt technique and a covert technique is applied to the surface of the security label 116. Specifically, a logo of the manufacturer of the ink cartridge 110 is printed on a portion of the surface of the security label 116 through the use of a color shifting ink whose color changes according to the viewing angle, and on another portion of the surface of the security label 116, the cartridge ID of the ink cartridge 110 is printed invisibly through the use of fluorescent ink which is made visible by ultraviolet irradiation. When the ink cartridge 110 is installed in the carriage 120, the ink cartridge 110 is conveyed by the carriage motor 125 to a position facing the scanner 160 which is provided inside the printer 100. Ultraviolet rays are then radiated by the light source (black light) provided in the scanner 160, fluorescence from the security label 116 is detected by the image sensor in the scanner 160, and the cartridge ID is thereby read.

A flash memory 170 in which various information is recorded in nonvolatile fashion; a liquid crystal monitor 180 for displaying an operating screen and the transaction screen; a card reader 185 for reading data (referred to hereinafter as "data for printing") which are to be printed from a memory card MC; a network interface 190 for receiving communication with the Internet NT or data for printing from other instruments; an operating panel 195 for receiving operations from the user; and other components are connected to the control unit 150 (FIG. 2).

Storage regions maintained within the flash memory 170 include a cartridge ID storage region 172 in which the cartridge ID is recorded; a ink level storage region 174 in which the ink level is recorded; a printer ID storage region 176 in which the printer ID uniquely assigned to the printer 100 is recorded; and a user ID storage region 178 in which the user ID of the user of the printer 100 is recorded. The printer ID is uniquely assigned in advance to each printer 100 by the manufacturer of the printer 100, for example. The MAC address which is specific to the network interface 190 can also be substituted for the printer ID. An email address of the user, for example, can be used as the user ID.

The control unit 150 is configured as a computer provided with a CPU and memory. The CPU functions as the print control section 152, read control section 154, ink level detection section 156, information communication section 158, and order processing section 159 shown in the drawing, by executing a predetermined program stored in the memory.

The print control section 152 has the function of controlling the carriage motor 125, the paper feed motor 130, and the print head 135, so as to print the data for printing which are read from the memory card MC, or the data for printing which are received through the network interface 190, on the printing paper PA.

The read control section 154 has the function of controlling the scanner 160 so as to read the cartridge ID from the security label that is affixed to the ink cartridge 110. The read control section 154 records the read cartridge ID in the cartridge ID storage region 172 in the flash memory 170. All cartridge IDs which have been read by the read control section 154 are accumulated in the cartridge ID storage region 172.

The ink level detection section 156 estimates the amount of ink remaining in the ink cartridge 110. Specifically, the ink level detection section 156 estimates the amount of ink remaining in the ink cartridge 110 according to the number of times the print head 135 has been driven by the print control section 152. The amount of ink may also be estimated from the resonance frequency by oscillating the ink inside the ink cartridge 110, or by such other means as measuring the hydraulic pressure of the ink inside the ink cartridge 110. The ink level detection section 156 records the estimated ink level in the ink level storage region 174 in the flash memory 170.

The information communication section 158 has the function of transmitting the cartridge ID, the printer ID, the user ID, and other information to the management server 200 via the Internet NT.

The order processing section 159 has the function of performing processing for placing an order for an ink cartridge 110 with the management server 200 via the Internet NT. The order processing section 159 detects that an order button in the operating panel 195 is pressed, the order processing section 159 accesses the management server 200 through the Internet NT and displays the transaction screen provided by the management server 200 on the liquid crystal monitor 180. The transaction screen is described by HTML, for example, and is transmitted from the management server 200 to the printer 100 by using HTTP protocol.

FIG. 4 is a view showing an example of the transaction screen displayed on the liquid crystal monitor 180. The type (color), price, and ink level of the ink cartridge 110 used in the printer 100, and the user ID and current number of points acquired by the user are displayed in the transaction screen. Among this displayed information, the ink level or the user ID is information stored in the flash memory 170 of the printer 100, and the other items of information are information which is provided from the management server 200. The user operates the operating panel 195 to specify the number of ink cartridges 110 needed and the number of points to be used, and presses the order button. An order is thereby placed with the management server 200 for the ink cartridge 110. The user ID for ordering, the payment method, the delivery method, the delivery address, and other information can be registered in advance in the management server 200 or the flash memory 170.

(A3) Configuration of the Management Server

Figures 5, 6:
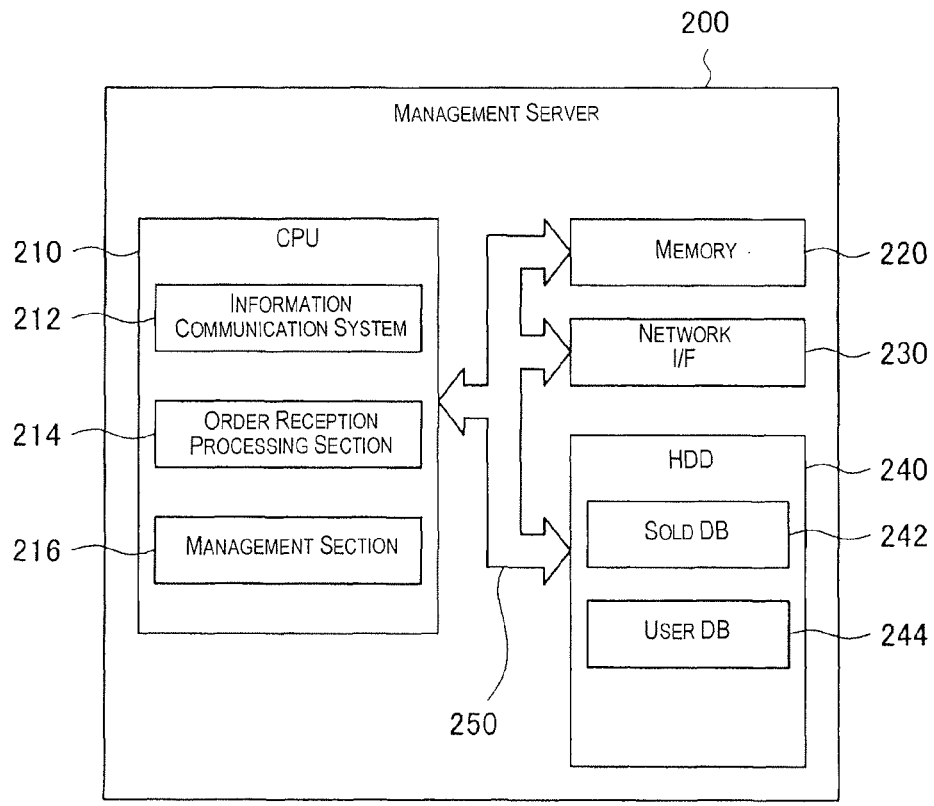
FIG. 5 is a view showing the internal configuration of the management server.
FIG. 6 is a view showing an example of the sold ID database.

FIG. 5 is a view showing the internal configuration of the management server 200. A CPU 210, a memory 220, a network interface 230, and a hard disk drive 240 are connected by a predetermined bus 250, and the management server 200 is thereby formed. A sold ID database 242 and a user database 244 are stored in the hard disk drive 240. The sold ID database 242 corresponds to the "registered database" of the present application, and the user database 244 corresponds to the "identification information database" of the present application.

FIG. 6 is a view showing an example of the sold ID database 242. As shown in FIG. 6, the cartridge ID of the ink cartridge 110 sold by the management server 200, and the user ID of the buyer are associated and recorded in the sold ID database 242. Besides this information, the sale time and other information, for example, may also be recorded in the sold ID database 242. A configuration may also be adopted in which the cartridge IDs of unsold ink cartridges 110 are stored, and any cartridge ID that is not stored can be determined to be an ink cartridge 110 that has been sold. Alternatively, a configuration may be adopted in which a rule for cartridge IDs of sold ink cartridges 110 is stored, and the rule can be used to determine that an ink cartridge 110 is a sold ink cartridge 110. Although indirectly in these configurations, the information is considered to have been registered in the sold ID database 242. In other words, in these alternative configurations it is determined that an ink cartridge 110 is a sold ink cartridge 110, and thus, the user database 244 needs to be updated, when it is determined the cartridge ID is missing from the sold ID database 242, or that the cartridge ID is consistent with a rule registered in the sold ID database 242.

view showing an example of the user database 244. As shown in FIG. 7, the total number of points issued to the user, the printer ID of the user's printer, and the cartridge ID are associated with a user ID and recorded in the user database 244.

The CPU 210 (FIG. 5) of the management server 200 functions as an information communication section 212, an order reception processing section 214, and a management section 216 by executing a predetermined program stored in the memory 220.

The information communication section 212 receives the user ID, printer ID, and cartridge ID from the printer 100 through the Internet NT.

The order reception processing section 214 has the function of receiving an order for the ink cartridge 110 from the printer 100. The order reception processing section 214 transmits the transaction screen described by HTML to the printer 100 when access occurs from the printer 100 through the Internet NT. When an order for the ink cartridge 110 is received from the printer 100 through the transaction screen, the order reception processing section 214 requests delivery of the ordered ink cartridge 110 from the delivery company SH by a predetermined communication means.

The management section 216 has the function of managing the cartridge IDs received by the information communication section 212 and issuing points, through the use of the sold ID database 242 and the user database 244.

(A4) Point Issuance Processing

Figure 8:
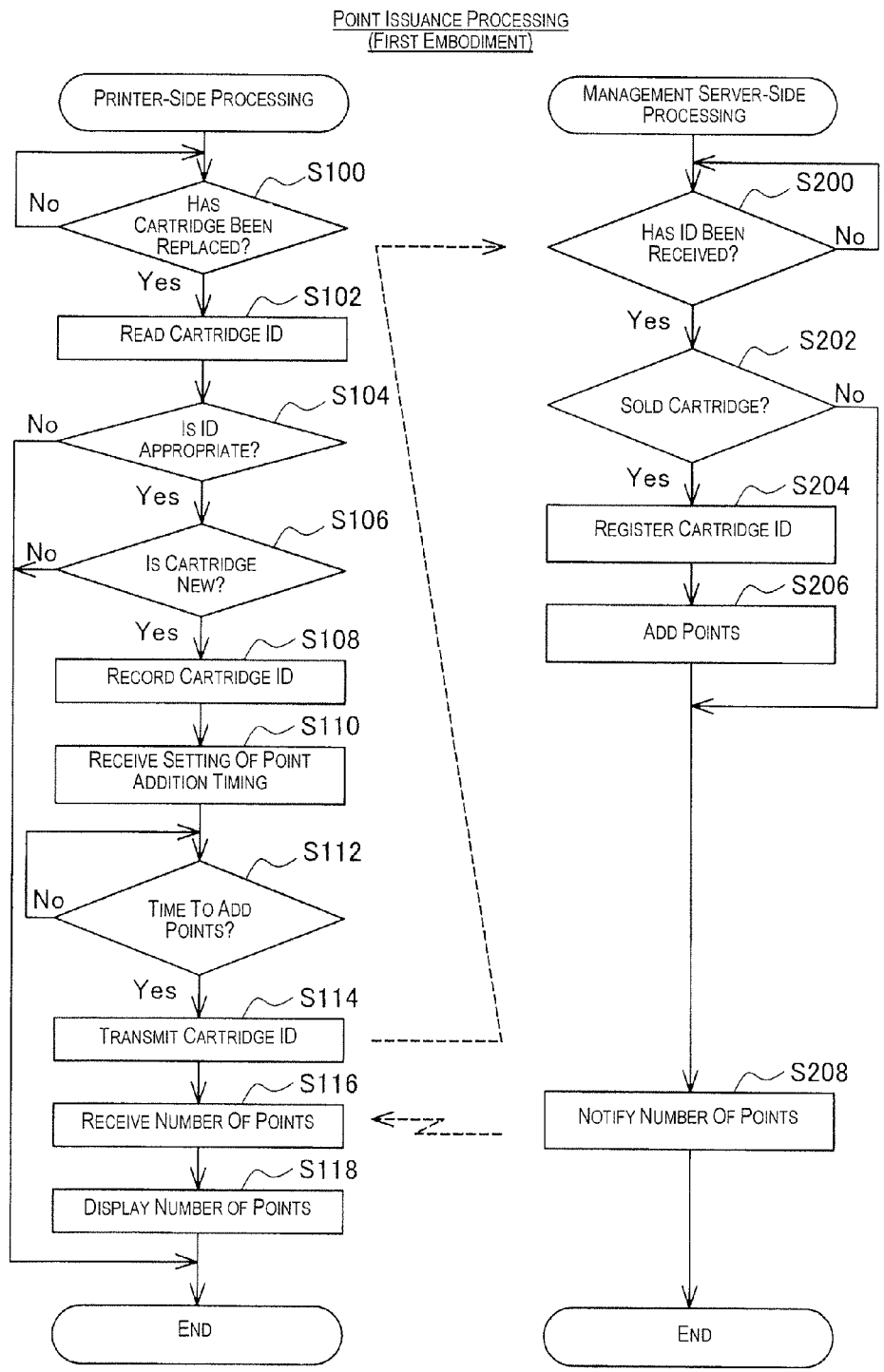
FIG. 8 is a flowchart showing the point issuance processing.

FIG. 8 is a flowchart showing the point issuance processing performed between the printer 100 and the management server 200. In this processing, the control unit 150 of the printer 100 first determines whether the ink cartridge 110 has been replaced (step S100). The control unit 150 can determine that the ink cartridge 110 has been replaced when a predetermined button (e.g., the "replacement-completed button") in the operating panel 195 is pressed.

In a case in which the determination is made that the ink cartridge 110 has been replaced, the scanner 160 in the printer 100 is controlled by the read control section 154, and the cartridge ID recorded in the security label 116 of the replacement ink cartridge 110 is read (step S102).

When the cartridge ID is read, the control unit 150 of the printer 100 determines whether the cartridge ID is appropriate (step S104). In this determination processing, a determination can be made that the cartridge ID is appropriate in such cases as when the cartridge ID is a cartridge ID that is appropriately imparted to an ink cartridge of the type that corresponds to the printer 100, the position at which the ink cartridge 110 is set in the carriage 120 and the ink color indicated by the cartridge ID appropriately correspond, and the expiration date of the ink cartridge 110 indicated by the cartridge ID has not arrived. When the cartridge ID is not appropriate, the control unit 150 produces an error display and ends the processing. On the other hand, when the cartridge ID is appropriate, the control unit 150 references the cartridge ID storage region 172 in the flash memory 170 and determines whether the replacement ink cartridge 110 is an ink cartridge 110 that is installed in the printer 100 for the first time (step S106). In a case in which the read cartridge ID is not yet recorded in the cartridge ID storage region 172, the control unit 150 can determine that the cartridge ID is that of an ink cartridge 110 that is installed in the printer 100 for the first time. When a determination is made that the installed ink cartridge 110 is not being installed for the first time, the control unit 150 ends the point issuance processing.

On the other hand, when a determination is made that the installed ink cartridge 110 is an ink cartridge 110 that is installed in the printer 100 for the first time, the control unit 150 adds the cartridge ID read in step S102 to the cartridge ID storage region 172 in the flash memory 170 (step S108). The control unit 150 then displays a confirmation screen on the liquid crystal monitor 180 indicating that a new ink cartridge 110 has been installed, and receives setting of the timing for adding points (step S110).

Figure 9A:
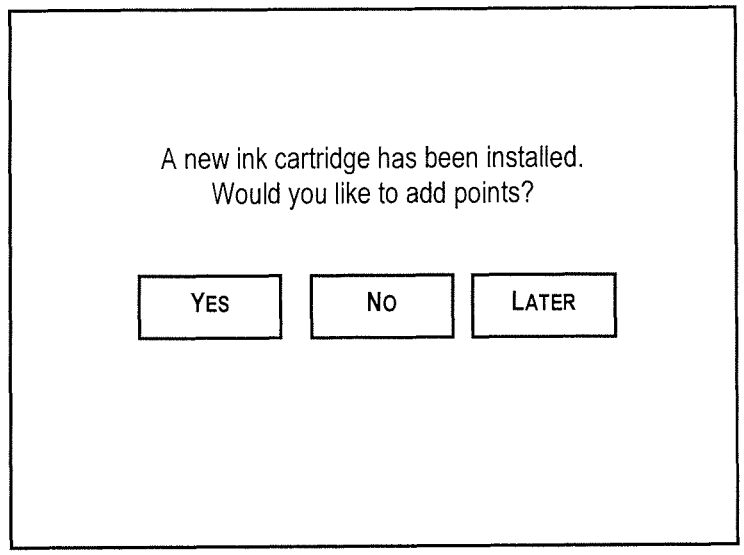
FIGS. 9A and 9B are views showing an example of the confirmation screen displayed on the liquid crystal monitor.
Figure 9B:
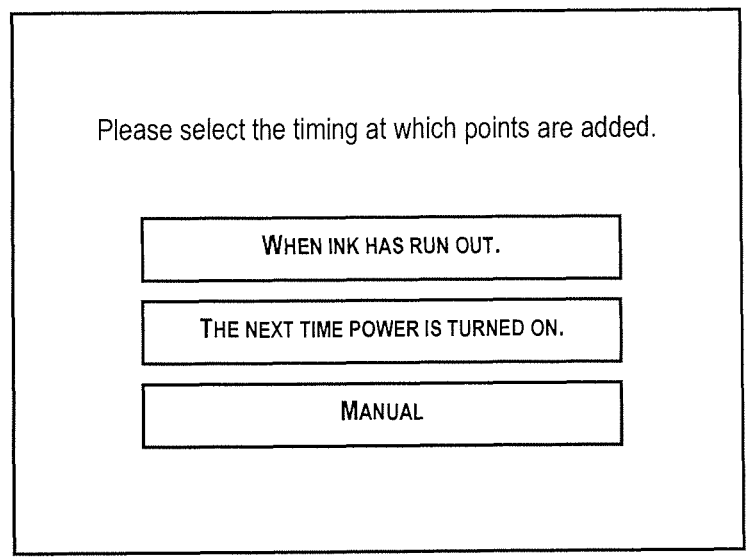

FIGS. 9A and 9B are views showing an example of the confirmation screen displayed on the liquid crystal monitor 180 in step S110 described above. As shown in FIG. 9A, the control unit 150 displays the message, "A new ink cartridge has been installed. Would you like to add points?" on the liquid crystal monitor 180, and receives a selection of "Yes," "No," or "Later" from the user. When "Yes" is selected, the control unit 150 executes step S110, then immediately performs processing for adding points. When "No" is selected, the control unit 150 ends the point issuance processing without adding points. When "Later" is selected, the control unit 150 switches the display to a screen for asking when to add points, as shown in FIG. 9B. In this screen, a selection can be made to add points when the ink runs out, at the next time the power supply of the printer 100 is turned on, or by an operation (manual) by the user, for example.

When the setting of the timing for adding points is received as described above, the control unit 150 of the printer 100 determines whether the current time is the timing set in step S110 (step S112). When the current time is the set timing, the control unit 150 transmits the user ID and the cartridge ID red in step S102 to the management server 200, through the use of the information communication section 158 (step S114). On the other hand, when the current time is not the set timing, the process waits until the set timing is reached. In a case in which the setting of not adding points is made in step S110, the control unit 150 skips the processing subsequent to step S112 and ends the point issuance processing.

When the cartridge ID and the user ID are transmitted to the management server 200 by the printer 100, the information communication section 212 of the management server 200 receives these IDs (step S200). The management section 216 of the management server 200 then determines whether the user database 244 needs to be updated by the information transmitted from the printer 100. More specifically, in this embodiment, the management section 216 of the management server 200 determines whether the received cartridge ID is the ID of the ink cartridge 110 sold through the management server 200 (step S202). Specifically, in a case in which a cartridge ID that matches the received cartridge ID is present among the cartridge IDs registered in the sold ID database 242, the management section 216 can determine that the received cartridge ID is the cartridge ID of the ink cartridge 110 sold through the management server 200.

When the management section 216 of the management server 200 determines that the received cartridge ID is the cartridge ID of the ink cartridge 110 sold through the management server 200, the management section 216 associates the cartridge ID with the user ID received in step S200 and registers the cartridge ID in the user database 244 (step S204), and also adds a predetermined number of points to the user ID (step S206). On the other hand, when the determination is made that the received cartridge ID is not the ID of the ink cartridge 110 sold through the management server 200, the management section 216 does not register the cartridge ID or add points. Lastly, the management section 216 of the management server 200 notifies the printer 100 as to the current number of points of the user and the number of added points (step S208).

When the printer 100 receives notification of the number of points from the management server 200 (step S116), the printer 100 displays the notified number of points on the liquid crystal monitor 180 (step S118) and ends the point issuance processing.

Figures 10, 11:
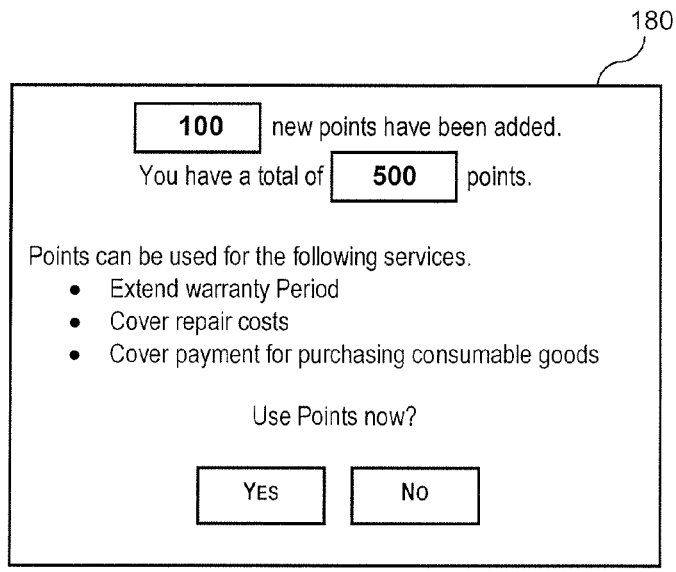
FIG. 10 is a view showing an example of the display of the number of points.
FIG. 11 is a view showing an example of the user database in a second embodiment.

FIG. 10 is a view showing an example of the display of the number of points. This display screen displays the number of newly added points and the total number of points that have been issued to the user. The display screen indicates that points can be used to extend the warranty period, allocated for repair costs, or allocated as payment to purchase consumable goods, and a confirmation message is displayed asking whether to use points immediately. When "Yes" is selected, the control unit 150 of the printer 100 accesses the management server 200 and displays a predetermined transaction screen (see FIG. 4, for example). When "No" is selected, the screen shown in FIG. 10 is cleared, and the normal operation screen is displayed. In a case in which a determination is made in step S202 that the received cartridge ID is not the cartridge ID of the ink cartridge 110 sold through the management server 200, the printer 100 can receive notification of this determination from the management server 200 and display on the liquid crystal monitor 180 a message to the effect that the newly installed ink cartridge 110 is not a cartridge for which points are to be added.

In the management system 10 according to the first embodiment described above, the cartridge ID invisibly recorded on the security label 116 which is affixed to the ink cartridge 110 is optically read by the printer 100, and the cartridge ID is transmitted to the management server 200 which is connected via the Internet NT. When the management server 200 receives the cartridge ID from the printer 100, the management server 200 determines whether the cartridge ID is that of a cartridge sold through the management server 200, and when the cartridge ID is that of a cartridge sold through the management server 200, the management server 200 issues points to the user. In such a management system 10, since there is no need to store the cartridge ID in a memory IC for packaging with the ink cartridge 110, as in the prior art, the ink cartridge 110 can be manufactured at low cost. Since the cartridge ID is also invisibly recorded on the security label which is affixed to the ink cartridge 110, there are no read errors or other errors caused by defects in electrical contact, such as in a memory IC. It is therefore possible to accurately determine, based on the read cartridge ID, whether the ink cartridge 110 is an ink cartridge sold through the management server 200. Furthermore, in the present embodiment, the management server 200 can centrally manage the ink cartridge 110 that is actually being used in the printer 100, among the ink cartridges 110 that have been sold. It is therefore possible to easily adjust production or manage inventory of the ink cartridge 110.

In the present embodiment, before points are issued by the management server 200, a determination is made on the printer 100 side as to whether the ink cartridge 110 is installed in the printer 100 for the first time, and when the ink cartridge 110 is one that is installed for the first time, the cartridge ID of the ink cartridge 110 is transmitted to the management server 200. As a result, since there is no need to transmit all of the cartridge IDs through the Internet NT, network traffic can be prevented from increasing. Since there is also no need for a determination to be made on the management server 200 side as to whether the ink cartridge 110 is one that is installed in the printer 100 for the first time, the processing load on the management server 200 side can be reduced.

B. Second Embodiment

A second embodiment of the present invention is described below. In the management system 10 of the second embodiment, the ink level in each ink cartridge is managed by the management server 200, in addition to the cartridge ID and points.

(B1) System Configuration

The management system 10 of the present embodiment has substantially the same configuration as the management system 10 of the first embodiment. Therefore, only those aspects of the present embodiment that differ from the first embodiment will be described. In the present embodiment, in order for the ink level to be managed by the management server 200, the information communication section 158 (see FIG. 2) of the printer 100 has the function of periodically (every one hour, for example) transmitting the ink level recorded in the ink level storage region 174 of the flash memory 170 to the management server 200 together with the cartridge ID. The timing at which the ink level is transmitted can otherwise be set to the time that the printer 100 is powered on or off, the time at which a printing job ends, and various other times, for example. In the present embodiment, the information communication section 212 (see FIG. 5) of the management server 200 has the function of receiving the ink level and cartridge ID from the printer 100, and associating an ink level with each cartridge ID and recording the ink level in a user database 244b.

FIG. 11 is a view showing an example of the user database 244b which the management server 200 of the present embodiment stores in the hard disk drive 240. As shown in FIG. 11, an ink level transmitted from the printer 100 is associated with each cartridge ID and recorded in the user database 244.

(B2) Point Issuance Processing

Figure 12:
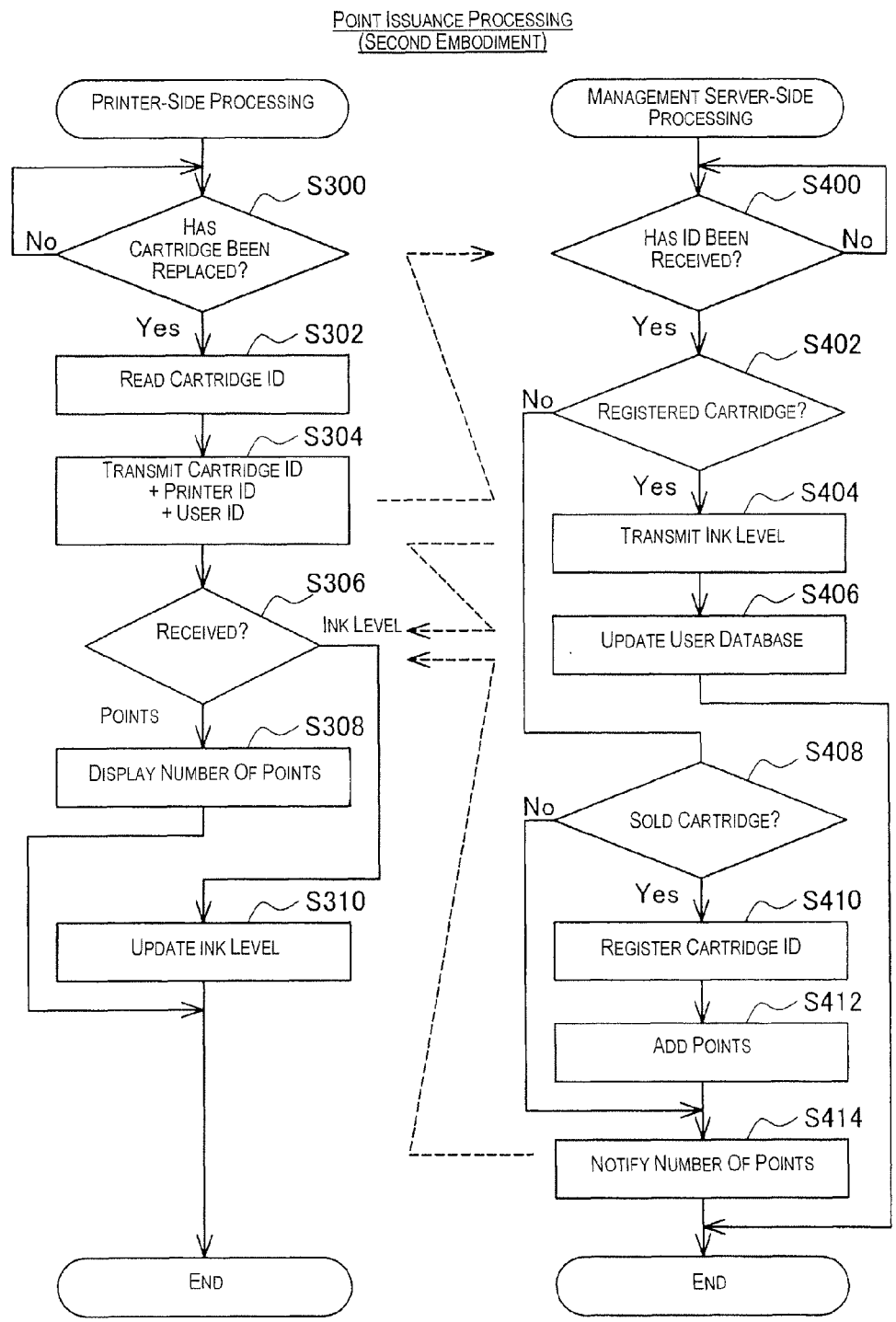
FIG. 12 is a flowchart showing the point issuance processing in the second embodiment.

FIG. 12 is a flowchart showing the point issuance processing that is executed in the second embodiment. In the point issuance processing in the present embodiment, the control unit 150 of the printer 100 first determines whether the ink cartridge 110 has been replaced (step S300). In a case in which the determination is made that the ink cartridge 110 has been replaced, the scanner 160 in the printer 100 is controlled by the read control section 154, and the cartridge ID recorded in the security label 116 of the replacement ink cartridge 110 is read (step S302).

When the cartridge ID is read, the control unit 150 of the printer 100 transmits the read cartridge ID and the printer ID and user ID stored in the flash memory 170 to the management server 200 together with information indicating that point issuance processing is in effect (i.e., that the ink cartridge 110 has been replaced), through the use of the information communication section 158 (step S304). Before transmitting these IDs, the control unit 150 of the printer 100 may also determine whether the cartridge ID read in step S302 is an appropriate ID, in the same manner as in the first embodiment.

When the management server 200 receives the cartridge ID, the printer ID, and the user ID from the printer 100 through the information communication section 212 (step S400), the management section 216 determines whether the received cartridge ID is already registered in the user database 244b (step S402). When the determination is made that the received cartridge ID is already registered in the user database 244b, the management server 200 transmits the ink level associated with the cartridge ID to the printer 100, through the use of the information communication section 212 (step S404). The user database 244b is then updated by newly associating the already registered cartridge ID and the ink level thereof with the user ID and printer ID received in step S400 (step S406).

In a case in which the ink level is received from the management server 200 (step S306), the printer 100 updates the ink level storage region 174 in the flash memory 170 with the received ink level (step S310), and ends the point issuance processing.

In a case in which a determination is made in step S402 that the ink cartridge 110 that corresponds to the cartridge ID received in step S400 is not registered in the user database 244b, the management section 216 of the management server 200 further references the sold ID database 242 and determines whether the cartridge ID is the cartridge ID of the ink cartridge 110 sold through the management server 200 (step S408).

When the management section 216 of the management server 200 determines that the received cartridge ID is the cartridge ID of the ink cartridge 110 sold through the management server 200, the management section 216 associates the cartridge ID with the user ID and printer ID received in step S400 and registers the cartridge ID in the user database 244b (step S410), and also adds a predetermined number of points to the user ID (step S412). On the other hand, when the determination is made that the received cartridge ID is not the ID of the ink cartridge 110 sold through the management server 200, the management section 216 does not register the cartridge ID or add points. Lastly, the management section 216 of the management server 200 notifies the printer 100 as to the current number of points of the user and the number of added points (step S414).

When the printer 100 receives notification of the number of points from the management server 200 (step S306), the printer 100 displays the notified number of points on the liquid crystal monitor 180 (step S308) as shown in FIG. 10, and ends the point issuance processing.

In the management system 10 according to the second embodiment described above, when the cartridge ID is read from the ink cartridge 110, the printer 100 transmits the cartridge ID to the management server 200. The management server 200 then determines whether the cartridge ID is already registered in the user database 244b, and when the cartridge ID is already registered in the user database 244b, the management server 200 transmits the ink level associated with the cartridge ID to the printer 100. Therefore, in a case in which the ink cartridge 110 newly installed in the printer 100 has been installed in another printer 100 before, or in a case in which the ink cartridge 110 has been installed in the printer 100 before, notification as to the ink level specific to the ink cartridge 110 is issued from the management server 200 to the printer 100. As a result, although a memory IC is not packaged in the ink cartridge 110 as such, the ink level of each individual ink cartridge 110 can be precisely managed. It is therefore possible to use the same ink cartridge 110 in different printers 100, for example. In a case in which the printer 100 is not able to notify the management server 200 immediately upon replacement of the ink cartridge 110, the printer 100 may store the amount of ink used until communication with the management server 200 is possible, and include a notification as to the amount of ink used as soon as communication with the management server 200 is possible. In this case, the management server 200 subtracts the amount of ink used from the ink level already stored in the user database 244, updates the user database 244, and notifies the printer 100 as to the updated ink level. The printer 100 may also be configured so that in a case in which the ink cartridge 110 is replaced, the printer 100 determines whether the new ink cartridge 110 has been installed in the past, and when the ink cartridge 110 has been installed in the past, the printer 100 also notifies the management server 200 as to the last ink level from the time that the ink cartridge 110 was installed before. In this case, the management server 200 determines from the notified ink level whether the ink level has changed, and when the ink level has changed, the management server 200 notifies the printer 100 as to the ink level after the change. When the ink level has not changed, the management server 200 so notifies the printer 100. In a case in which the printer 100 is notified that there is no change in the ink level, the last ink level is considered to be the current ink level.

In the present embodiment, points are not issued in cases in which the cartridge ID received by the management server 200 from the printer 100 is already registered in the user database 244*b*. It is thereby possible to prevent points from being redundantly awarded when the ink cartridge 110 is repeatedly removed and installed in the printer 100, for example, and points can be fairly managed.

The management system 10 according to the second embodiment described above is configured so as to manage the ink level of the ink cartridge 110, but the subject of management is not limited to the ink level. For example, a configuration may be adopted in which the printer 100 detects errors (e.g., ink blockage errors or installation errors) relating to the ink cartridge 110 for each ink cartridge 110, transmits the error information to the management server 200, and stores the error information. Through this configuration, even when the same ink cartridge 110 is used in different printers 100, not only the ink level, but also the error information can be taken over.

In the second embodiment described above, when the cartridge ID is read from the ink cartridge 110, the printer 100 transmits the cartridge ID without modification to the management server 200. However, a configuration may also be adopted in the second embodiment whereby the printer 100 transmits the cartridge ID to the management server 200 in a case in which the read cartridge ID is not yet recorded in the cartridge ID storage region 172 of the flash memory 170, the same as in the first embodiment.

C. Modifications

Several embodiments of the present invention are described above, but the present invention is not limited to these embodiments, and various configurations may be adopted within the intended scope of the present invention. For example, functions which are realized by software may also be realized by hardware. Such other modifications or combinations thereof as are described hereinafter are also possible.

Modification 1

In the embodiments described above, points are issued when a new ink cartridge 110 is installed in a printer 100, but the timing at which points are issued is not thus limited. For example, points can be issued at various times, such as when a predetermined amount of ink has been consumed, or when a used ink cartridge 110 is recovered by the manufacturer or the delivery company SH. In a case in which the ink cartridge 110 is recovered by the manufacturer, the cartridge ID is read from the recovered ink cartridge 110 at the manufacturer, and the management server 200 is notified as to the cartridge ID. The management server 200 can thereby issue points to a user who has disposed of the ink cartridge 110 by the established route. The number of points issued to the user can also be changed according to the type (color) of the ink cartridge 110, for example.

Modification 2

In the first embodiment described above, a configuration may be adopted in which the cartridge ID of an ink cartridge 110 included with and shipped in the printer 100 is recorded in advance at the time of factory shipping in the cartridge ID storage region 172 in the flash memory 170 of the printer 100. Through such a configuration, the included ink cartridge 110 is considered to be a pre-installed ink cartridge 110 in the point issuance processing shown in FIG. 8, and the cartridge ID is no longer transmitted from the printer 100 to the management server 200. It is therefore possible to prevent points from being issued for the included ink cartridge 110. It is possible to prevent points from being issued for the included ink cartridge 110 in the second embodiment by registering the cartridge ID of the included ink cartridge 110 in advance in the user database 244*b*.

Modification 3

In the embodiments described above, the management server 200 is configured so as to perform both the services of electronic transactions and managing the ink cartridge 110. However, electronic transactions may also be performed by another server (electronic transaction server) connected to the Internet NT. In this case, the management server 200 receives notification as to the cartridge ID of the ink cartridge 110 that is sold by the electronic transaction server from the electronic transaction server, and registers the cartridge ID in the sold ID database 242. The management server 200 also notifies the electronic transaction server as to the points of each user. Through such a configuration, the processing burden of the management server 200 can be reduced.

Modification 4

In the embodiments described above, the printer 100 as a unit transmits orders for ink cartridges 110, cartridge IDs, and the like. However, a portion of the functions (e.g., the functions of the ink level detection section 156, the information communication section 158, and the order processing section 159) provided to the printer 100 may be realized by a personal computer which is connected to the printer 100. In this case, the combination of the printer 100 and the personal computer corresponds to the "electronic instrument" of the present application. The remaining weight or remaining volume of ink is also managed in the above embodiments as at least a portion of state information as the ink level, but the ink level may also be managed as the remaining time until the expiration date of the ink. In a case in which heating occurs during use of the ink, and the ink degrades when heating is prolonged, for example, it is preferred that management relate to at least any of the usage period, remaining time, and heating time of the ink.

Modification 5

In the embodiments described above, the cartridge ID is recorded on the security label 116 through the use of fluorescent ink which reacts to ultraviolet rays. However, the cartridge ID may be recorded by printing on the security label 116 with infrared-absorbing (or reflecting) ink, liquid crystal ink, or various other types of invisible ink. Moreover, in a security label printed by ink (e.g., color shifting ink or the like) which can be read through a polarizing plate, or a security label fabricated by a technique in which a surface treatment for refracting light is applied by an optical technique rather than a printing technique, and the label can be read through a polarizing plate, the security label can be read by placing a polarizing plate between the security label 116 and the read surface of the scanner 160. The security label 116 may also be recorded on by a magnetic stripe or the like and read by non-optical means. The cartridge ID may also be recorded in encoded form on the security label 116, and decoded when read by the printer 100. The security label 116 is also not limited to being on the bottom surface of the ink cartridge 110, and may be affixed in any position. Printing of a logo (overt printing) by color shifting ink may also be omitted. In a case in which the cartridge ID is set directly in the position in which the ink cartridge 110 is used, rather than on the security label 116, the cartridge ID may be formed (printed or recorded) in a position of the ink cartridge 110 so as to face the scanner, or may be formed (printed or recorded) on an accompanying item to the ink cartridge 110 that is not in the form of a label.

Modification 6

In the embodiments described above, the printer 100 is applied as the electronic instrument of the present application, and the ink cartridge 110 is applied as the managed article of the present application. However, the electronic instrument and the managed article are not thus limited. The ink as such may be applied as the managed article. Printing media such as photographic paper, printing film, or roll paper, for example, may also be applied as the managed article, security labels may be affixed to these printing media, or a security label may be affixed to the spool of a roll-paper-shaped printing medium. The printer 100 can thereby distinguish the type, characteristics, size, number of sheets used, and other properties of the printing paper, for example, on the basis of the information recorded on the security label. For example, by affixing security labels to roll paper at fixed intervals, bonus points can be provided each time a predetermined number of security labels are read. When a security label is affixed to printing paper, based on the information recorded on the security label, the printer 100 can switch the color conversion table (LUT) used during image processing and print in colors which are adapted to the characteristics of the printing paper.

Besides a printer 100, an instrument such as a personal computer or a DVD recorder can also be applied as the electronic instrument of the present application. In this case, a CD-R, DVD-RW, memory card, or other recording media can be applied as the managed article. For example, when a security label is affixed to these recording media, and the information recorded on the security label is read by the personal computer, DVD recorder, or other electronic instrument, points can be issued to the user of the recording media sold through the management server 200.

Modification 7

In the embodiments described above, the cartridge ID transmitted from the printer 100 is recorded in the user database 244 and points are imparted only in a case in which the cartridge ID is registered in the sold ID database 242 stored in the management server 200. However, the processing may also be changed in accordance with the sale method, such as by storing the cartridge ID of a sold ink cartridge for each sale method (including mail order/over-the-counter sale and other sales channels, or normal sale/campaign sale and other sales formats) and changing the imparted number of points according to the sale method.

Modification 8

In the embodiments described above, the cartridge ID transmitted from the printer 100 is recorded in the user database 244 only in a case in which the cartridge ID is registered in the sold ID database 242 stored in the management server 200. However, a configuration may also be adopted in which the management server 200 records all cartridge IDs transmitted from the printer 100 in the user database 244 regardless of whether the cartridge IDs are registered in the sold ID database 242. In this case, among the cartridge IDs recorded in the user database 244, points can be issued and the ink level can be managed for cartridge IDs that are registered in the sold ID database 242. In the embodiments described above, the management server 200 stores the sold ID database 242 and the user database 244 separately, but these database may also be integrated into a single database.

Modification 9

Due to increased environmental conservation awareness of users in recent years, recycling operations for recovering used ink cartridges have become an important business activity. In cases in which used ink cartridges 110 are recovered by the manufacturer or delivery company SH, a number of points in addition to normal points can be added to the user as environmental points. Environmental points or the like can also be added in the same manner for recovery not only of ink cartridges 110, but also DVD-R media and the like for which writing has failed, and used recording media.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A management system comprising:
an electronic instrument that uses a managed article; and
a management server configured to communicate with the electronic instrument, the electronic instrument including
an acquisition section configured to acquire identification information from the managed article used by the electronic instrument, the identification information being read-only information, the identification information being invisibly recorded on a label that is attached to the managed article, the acquisition section acquiring the identification information that is optically read by the electronic instrument, a state detection section configured to detect a state of the managed article, and an electronic instrument-side communication section configured to transmit information including the identification information acquired by the acquisition section and state information detected by the state detection section to the management server, the state information indicating the state of the managed article, and the management server including a management server-side communication section configured to receive the information including the identification information and the state information transmitted from the electronic instrument, a storage section configured to store registered database in which information corresponding to identification information of a plurality of managed articles that the management server handles is registered in advance, and to store identification information database in which the identification information and the state information included in the information received from the electronic instrument are stored, and a management section configured to determine whether the identification information included in the information received from the electronic instrument matches recorded identification information that has been already recorded in the identification information database, to transmit recorded state information that is associated with the recorded identification information and has been already recorded in the identification information database to the electronic instrument when determining that the identification information included in the information received from the electronic instrument matches the recorded identification information, the recorded state information indicating a previous state of the managed article, and to update the recorded state information to the state information included in the information received from the electronic instrument;

wherein the management section of the management server is configured to determine that the identification information database is required to be updated by the information transmitted from the electronic instrument when it is determined that the identification information included in the information received transmitted from the electronic instrument is the same as the identification information already registered in the registered database, that the identification information included in the information transmitted from the electronic instrument is missing from the registered database, or that the identification information included in the information transmitted from the electronic instrument is consistent with a rule registered in the registered database.

2. The management system according to claim 1, wherein the identification information database includes user identification information for identifying a user of the electronic instrument, the electronic instrument-side communication section is configured to transmit the information further including the user identification information to the management server, and the management section is configured to reference the registered database and the identification information database to determine whether the information corresponding to the identification information included in the information received from the electronic instrument is registered in the registered database but the identification information is not yet recorded in the identification information database, and to record earned points in the identification information database for the user indicated by the user identification information included in the information received from the electronic instrument when determining that the information corresponding to the identification information included in the information received from the electronic instrument is registered in the registered database but the identification information is not yet recorded in the identification information database.

3. The management system according to claim 1, wherein the electronic instrument further includes an electronic instrument-side storage section configured to accumulate and store the identification information acquired by the acquisition section, and the electronic instrument-side communication section is configured to transmit the information including the identification information and the state information to the management server when it is determined that the identification information acquired by the acquisition section has not been stored in the electronic instrument-side storage section.

4. The management system according to claim 1, wherein the electronic instrument further includes a setting receiving section configured to receive a setting for a timing at which the electronic instrument-side communication section transmits the identification information acquired by the acquisition section to the management server.

5. The management system according to claim 1, wherein the managed article is one of an ink cartridge and a printing medium, and the electronic instrument is a printer including a printing section configured to perform printing using the one of the ink cartridge and the printing medium.

6. A management system comprising:

an electronic instrument that uses a managed article; and a management server configured to communicate with the electronic instrument, the electronic instrument including an acquisition section configured to acquire identification information from an item accompanying the managed article used by the electronic instrument, the identification information being read-only information, the identification information being invisibly recorded on a label that is attached to the item accompanying the managed device, the acquisition section acquiring the identification information that is optically read by the electronic instrument, a state detection section configured to detect a state of the managed article, and an electronic instrument-side communication section configured to transmit information including the identification information acquired by the acquisition section and state information detected by the state detection section to the management server, the state information indicating the state of the managed article, and the management server including a management server-side communication section configured to receive the information including the identification information and the state information transmitted from the electronic instrument, a storage section configured to store registered database in which information corresponding to identification information of a plurality of managed articles is registered in advance, and to store identification information database in which the identification information and the state information included in the information received from the electronic instrument are stored, and a management section configured to determine whether the identification information included in the information received from the electronic instrument matches recorded identification information that has been already recorded in the identification information database, to transmit recorded state information that is associated with the recorded identification information and has been already recorded in the identification information database to the electronic instrument, when determining that the identification information included in the information received from the electronic instrument matches the recorded identification information, the recorded state information indicating a previous state of the managed article, and to update the recorded state information to the state information included in the information received from the electronic instrument;

wherein the management section of the management server is configured to determine that the identification information database is required to be update by the information transmitted from the electronic instrument when it is determined that the identification information included in the information received transmitted from the electronic instrument is the same as the identification information already registered in the registered database, that the identification information included in the information transmitted from the electronic instrument is missing from the registered database, or that the identification information included in the information transmitted from the electronic instrument is consistent with a rule registered in the registered database.

7. The management system according to claim 6, wherein the identification information database includes user identification information for identifying a user of the electronic instrument, the electronic instrument-side communication section is configured to transmit the information further including the user identification information to the management server, and the management section is configured to reference the registered database and the identification information database to determine whether the information corresponding to the identification information included in the information received from the electronic instrument is registered in the registered database but the identification information is not yet recorded in the identification information database, and to record earned points in the identification information database for the user indicated by the user identification information included in the information transmitted from the electronic instrument when determining that the information corresponding to the identification information included in the information received from the electronic instrument is registered in the registered database but the identification information is not yet recorded in the identification information database.

8. The management system according to claim 6, wherein the electronic instrument further includes an electronic instrument-side storage section configured to accumulate and store the identification information acquired by the acquisition section, and the electronic instrument-side communication section is configured to transmit the information including the identification information and the state information to the management server when it is determined that the identification information acquired by the acquisition section has not been stored in the electronic instrument-side storage section.

9. The management system according to claim 6, wherein the electronic instrument further includes a setting receiving section configured to receive a setting for a timing at which the electronic instrument-side communication section transmits the identification information acquired by the acquisition section to the management server.

10. The management system according to claim 6, wherein the managed article is one of ink and a printing medium, the item accompanying the managed article is an ink cartridge that accommodates the ink, or a spool on which the recording medium is wound, and the electronic instrument is a printer including a printing section configured to perform printing using the one of the ink and the printing medium.

11. The management system according to claim 6, wherein the managed article is one of an ink cartridge and a printing medium, the item accompanying the managed article is a packaging material that packages the one of the ink cartridge and the printing medium at the time of sale, or an included item which is packaged together with the one of the ink cartridge and the printing medium at the time of sale, and the electronic instrument is a printer including a printing section configured to perform printing using the one of the ink cartridge and the printing medium.

12. A management server for managing a managed article used by an electronic instrument with identification information for the managed article being recorded as read-only information, the management server comprising:

a management server-side communication section configured to receive the identification information and state information from the electronic instrument, the identification information being invisibly recorded on a label that is attached to the managed article or an item accompanying the managed article, the identification information being optically read by the electronic instrument, the state information indicating a state of the managed article;

a storage section configured to store registered database in which information corresponding to identification information of a plurality of managed articles that the management server handles is registered in advance, and to store identification information database in which the identification information and the state information received from the electronic instrument are stored; and a management section configured to determine whether the identification information received from the electronic instrument matches recorded identification information that has been already recorded in the identification information database, to transmit recorded state information that is associated with the recorded identification information and has been already recorded in the identification information database to the electronic instrument, when determining that the identification information received from the electronic instrument matches the recorded identification information, the recorded state information indicating a previous state of the managed article, and to update the recorded state information to the state information received from the electronic instrument in the identification information database;

wherein the management section of the management server is configured to determine that the identification information database is required to be updated by the information transmitted from the electronic instrument when it is determined that the identification information included in the information received transmitted from the electronic instrument is the same as the identification information already registered in the registered database, that the identification information included in the information transmitted from the electronic instrument is missing from the registered database, or that the identification information included in the information transmitted from the electronic instrument is consistent with a rule registered in the registered database.

13. An electronic instrument adapted to use a managed article managed by a management system including a management server, the electronic instrument comprising:

an acquisition section configured to acquire identification information from the managed article or from an item accompanying the managed article, the identification information being read-only information, the identification information being invisibly recorded on a label that is attached to the managed article or the item accompanying the managed article, the acquisition section acquiring the identification information that is optically read by the electronic instrument;

a state detection section configured to detect a state of the managed article used by the electronic instrument; and an electronic instrument-side communication section configured to transmit information including the identification information acquired by the acquisition section to the management server and state information detected by the state detection section, the state information indicating the state of the managed article, and to receive, when the identification information matches recorded identification information that has been already recorded in the management server, recorded state information that is associated with the recorded identification information and has been already recorded in the management server from the management server, the recorded state information indicating a previous state of the managed article;

wherein the management section of the management server is configured to determine that the identification information database is required to be updated by the information transmitted from the electronic instrument when it is determined that the identification information included in the information received transmitted from the electronic instrument is the same as the identification information already registered in the registered database, that the identification information included in the information transmitted from the electronic instrument is missing from the registered database, or that the identification information included in the information transmitted from the electronic instrument is consistent with a rule registered in the registered database.

14. A management method for managing by an electronic instrument and a management server, a managed article used by the electronic instrument configured to communicate with the management server, the management method comprising:

acquiring by the electronic instrument identification information from the managed article or from an item accompanying the managed article, the identification information being read-only information, the identification information being invisibly recorded on a label that is attached to the managed article or the item accompanying the managed article, the identification information being optically read by the electronic instrument;

detecting a state of the managed article by the electronic instrument;

transmitting information including the identification information acquired by the electronic instrument and state information detected by the electronic instrument from the electronic instrument to the management server, the state information indicating the state of the managed article;

receiving by the management server the information including the identification information and the state information transmitted from the electronic instrument;

determining by the management server whether the identification information included in the information received from the electronic instrument matches recorded identification information that has been already recorded in identification information database in which the identification information and the state information included in the information received from the electronic instrument are stored;

transmitting by the management server recorded state information that is associated with the recorded identification information and has been already recorded in the management server to the electronic instrument, when determining that the identification information included in the information received from the electronic instrument matches the recorded identification information, the recorded state information indicating a previous state of the managed article; and updating by the management server the recorded state information to the state information included in the information received from the electronic instrument in the identification information database;

wherein the management section of the management server is configured to determine that the identification information database is required to be updated by the information transmitted from the electronic instrument when it is determined that the identification information included in the information received transmitted from the electronic instrument is the same as the identification information already registered in the registered database, that the identification information included in the information transmitted from the electronic instrument is missing from the registered database, or that the identification information included in the information transmitted from the electronic instrument is consistent with a rule registered in the registered database.

* * * * *